United States Patent [19]

Hunter

[11] 4,193,305
[45] Mar. 18, 1980

[54] VEHICLE WHEEL AND TIRE BALANCE TESTING MACHINE

[76] Inventor: Lee Hunter, 13501 Ladue Rd., Ladue, Mo. 63141

[21] Appl. No.: 934,008

[22] Filed: Aug. 16, 1978

[51] Int. Cl.² ............................................. G01M 1/16
[52] U.S. Cl. ...................................... 73/462; 73/473
[58] Field of Search ................. 73/459, 462, 471, 473, 73/477

[56] References Cited

U.S. PATENT DOCUMENTS

| | | | |
|---|---|---|---|
| 3,130,587 | 4/1964 | Kinsey et al. | 73/462 |
| 3,182,511 | 5/1965 | Federn et al. | 73/477 |
| 3,605,502 | 9/1971 | Hack | 73/471 |
| 3,910,121 | 10/1975 | Curchod et al. | 73/462 |
| 3,924,473 | 12/1975 | Maus | 73/471 |
| 4,046,017 | 9/1977 | Hill | 73/462 |
| 4,085,619 | 4/1978 | Shapiro et al. | 73/462 |

Primary Examiner—Jerry W. Myracle
Attorney, Agent, or Firm—Gravely, Lieder & Woodruff

[57] ABSTRACT

A vehicle wheel and tire balance testing machine arranged with an unbalance sensitive member arranged along side the wheel and tire assembly, means to support the unbalance sensitive member so any unbalance forces generated upon rotation of the wheel and tire assembly will be picked up in the sensitive member, force transducer means engaged against the sensitive member in positions spaced from the wheel and tire so as to generate signals proportional to any unbalance present in the wheel and tire, means associated with the force transducer means for resolving the signals into the amount of unbalance in two planes of the wheel and tire assembly, and means for monitoring the location of the unbalance about the circumference of the wheel and tire in the respective planes thereof where unbalance is found.

11 Claims, 19 Drawing Figures

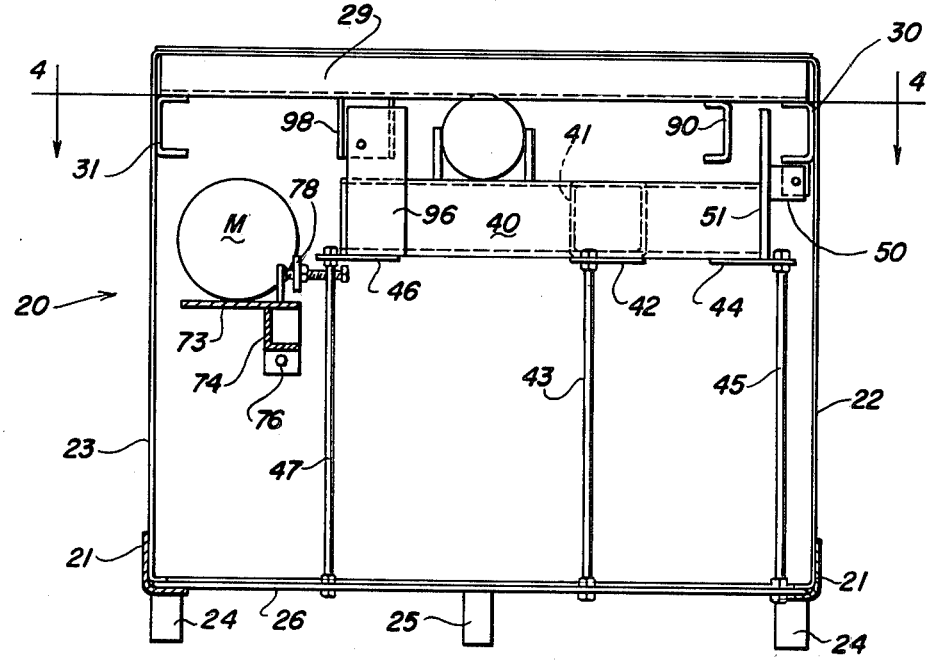
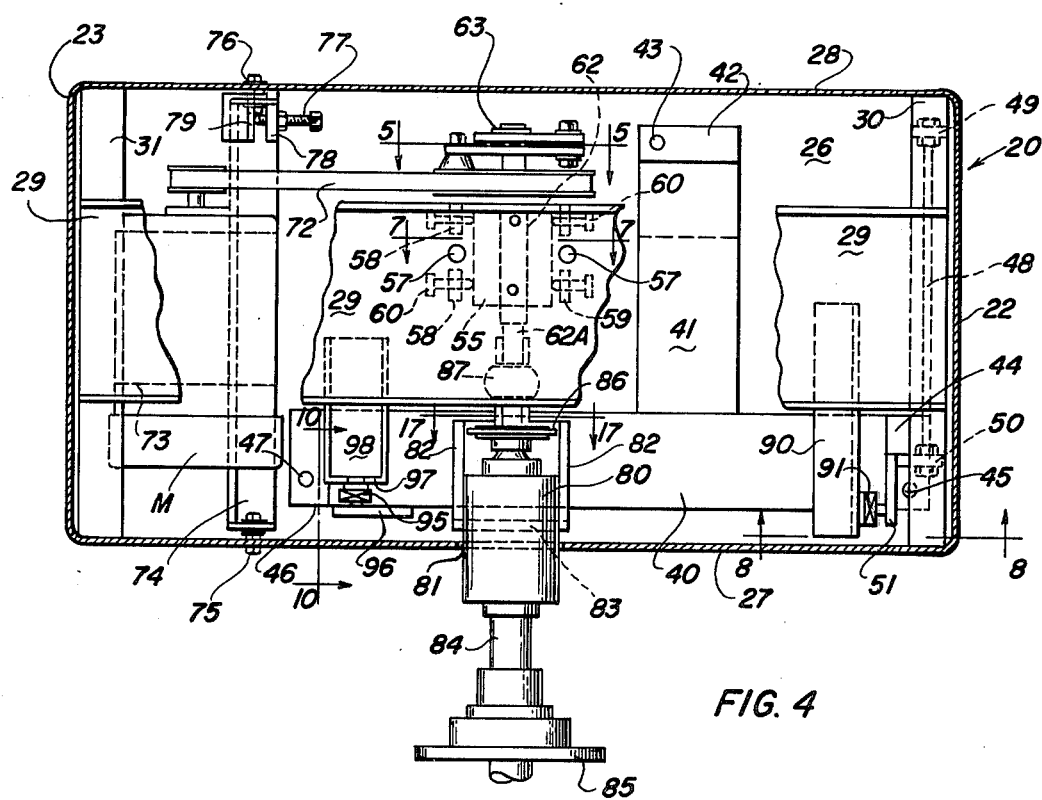

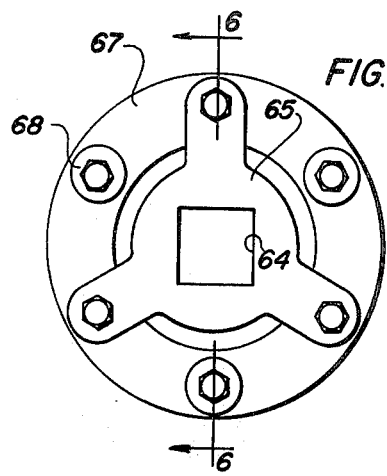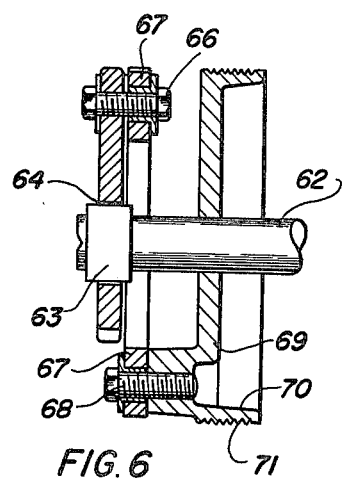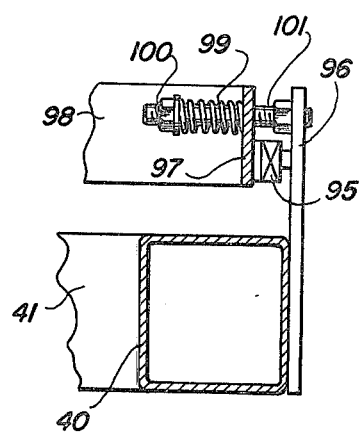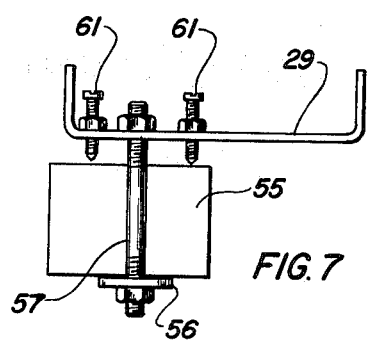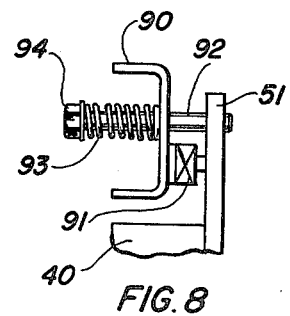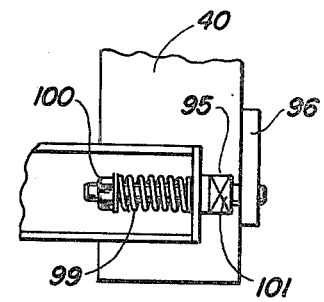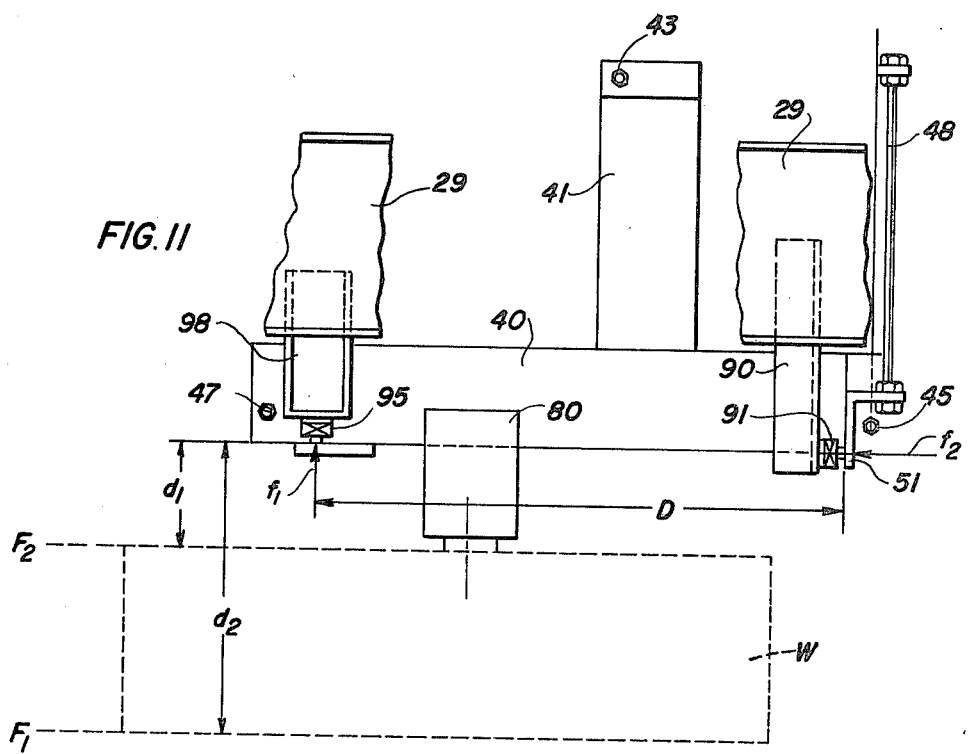

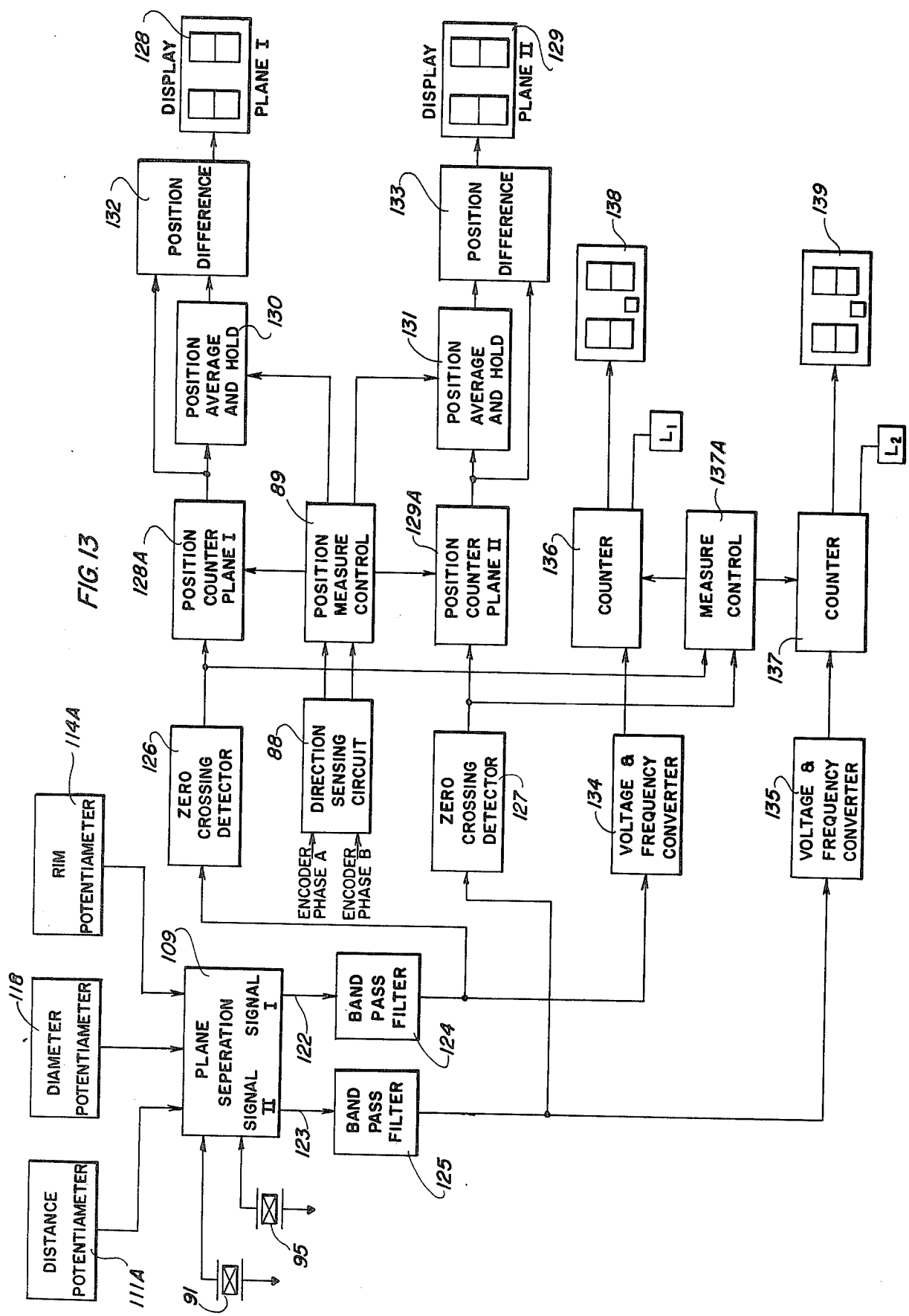

VEHICLE WHEEL AND TIRE BALANCE TESTING MACHINE

BACKGROUND OF THE INVENTION

Proper balancing of vehicle tires as well as a tire and wheel assembly is important for safety of vehicle operation and for getting the most wear from the tire. Balancers in the prior art have been divided into static and dynamic types, and while there are both types in daily use, the accuracy of each types has been put in question.

It is recognized that static balancers require the tire and wheel assembly to be removed from the vehicle and placed on a stand with the assembly in a generally horizontal position on a wobble axis so the unbalance condition will be revealed by the assembly tilting out of the horizontal. The static balancer is usually provided with a bubble to indicate when the tire and wheel assembly is in a proper horizontal or static balanced position, thereby indicating that the weight distribution around the circumference is evenly distributed when the bubble reaches a centered position. In order to center the bubble it is necessary for the operator to watch the bubble and experimentally apply a weight at various places around the periphery of the wheel rim, and to adjust the amount and position of the weight to obtain a balanced condition. The weight or weights may then be secured in position on the wheel rim. Occasionally when an excessively large single weight is required the operator will divide the amount of weight evenly and place the respective weights on opposite sides of the wheel rim on the theory that the unbalance may be on one side or the other of the tire.

Dynamic balancers are generally sub-divided into those which are operable without removing the tire and wheel from the vehicle, and those which are only operable when the tire and wheel have been removed. An example of the first type of dynamic balancers is disclosed in Hunter U.S. Pat. No. 2,662,396 issued Dec. 15, 1953, as well as Hunter U.S. Pat. No. 2,723,555 issued Nov. 15, 1955. These patents disclose balancer apparatus which must be attached to the wheel rim and are operable while the wheel and tire are in rotation to move a balancing weight to a position substantially opposite the unbalancing force, and to indicate the amount of weight needed to oppose the unbalancing force.

The second type of dynamic balancer requires the tire and wheel to be removed from the vehicle and be secured to a rotatable spindle. The rotation of the tire and wheel will generate a vibration which can be measured as to amount and direction for the purpose of selecting the amount of weight necessary to oppose the unbalancing force, as well as to locate the position for placing the balancing weight. An example of this type of dynamic balancer has been disclosed in Curchod, et al U.S. Pat. No. 3,910,121 issued Oct. 7, 1975.

Both types of dynamic balancers have advantages as well as disadvantages in that while dynamic balancing is preferred by some experts it requires careful balancing by the operator to place balancing weight in amount and location that will correct the unbalanced condition. Frequently vehicle tires have carcass material which is non-uniform and the result produces unbalance in the final tire. The non-uniformity of carcass material makes it difficult to find the place around the tire periphery for the weight which will oppose the unbalance condition and produce accurate dynamic balancing results. Generally, the type of defect in the tire construction that causes unusual or dangerous vehicle operations may be the result of uneven weight distribution in the tire body, faulty molding, belt mislocation in radial and bias-belted tires, slippage in the splices, or uneven thickness in the tire body. The problem is to correctly diagnose the defect and compensate for it by weights of the proper value located in the proper place or places.

BRIEF SUMMARY OF THE INVENTION

This invention relates to vehicle wheel and tire balance testing machines, and to means for calculating the amount and location of the unbalance conditions.

The important objects of the present invention are to provide dynamic balancing apparatus for a vehicle tire and wheel assembly which will be inexpensive to manufacture, will incorporate unbalance force sensing means responsive to unbalance in each of two planes of the tire and wheel assembly, will provide functionally responsive means which will be extremely accurate for determining the unbalance condition of a tire and wheel assembly, as well as possessing ability to indicate the distribution of counter balancing weight in two planes separated across the width of the assembly as well as the position where the balancing weight or weights needs to be added.

A preferred apparatus for determining the unbalance condition of a vehicle tire and wheel assembly comprises a stationary support for the operating components of the apparatus, an unbalanced force responsive unit mounted on and movable relative to the stationary support, unbalance force transducer means adjacent the tire and wheel supporting member, means carried by the force responsive unit to cooperate with the transducer means in producing signals proportional to the unbalance condition, and power operated means to rotate the tire and wheel assembly.

The foregoing preferred embodiment may be subject to variations in the makeup of the components so as to achieve the objective of providing apparatus having improvements in the determination of unbalance in a vehicle tire and wheel assembly. The preferred embodiment performs its novel functions by following a predefined sequence of operations which include: spinning the tire and wheel assembly to a predetermined speed at which voltage signals from force transducer means are obtained; monitoring the amount of the maximum unbalancing force and its position; braking the assembly to a stop; and displaying the position and corrective weight information for balancing the assembly.

DESCRIPTION OF THE DRAWINGS

The presently preferred embodiment of the invention is shown in the accompanying drawings, wherein:

FIG. 3 is a sectional elevational view of the apparatus as seen along line 3—3 in FIG. 1;

FIG. 4 is a somewhat enlarged fragmentary plan view of the apparatus with portions of the structure broken away to show important details of the operating components;

FIG. 5 is a fragmentary end view of the flexible drive assembly for the drive shaft as seen along line 5—5 in FIG. 4;

FIG. 6 is a sectional view taken along line 6—6 in FIG. 5;

FIG. 7 is a fragmentary sectional view taken along the line 7—7 in FIG. 4 to show the provision for adjusting the drive shaft bearing;

FIG. 8 is a fragmentary sectional view taken along the line 8—8 in FIG. 4 showing the arrangement of one of the unbalance sensors with preload means;

FIG. 9 is a fragmentary plan view of another unbalance sensor;

FIG. 10 is a fragmentary view of the last mentioned unbalance sensor as seen along line 10—10 in FIG. 4;

FIG. 11 is a fragmentary layout view similar to the view of FIG. 4, but modified to emphasize the geometry involved in translating the forces developed at sensors responsive to the forces of unbalance in the opposite planes of the tire and wheel assembly;

FIG. 13 is an expanded block diagram of the electronic circuits for converting the forces sensed at the piezoelectric crystal transducer into information concerning the presence of unbalance in a rotating wheel and tire;

DETAILED DESCRIPTION OF THE APPARATUS

Figure 1:
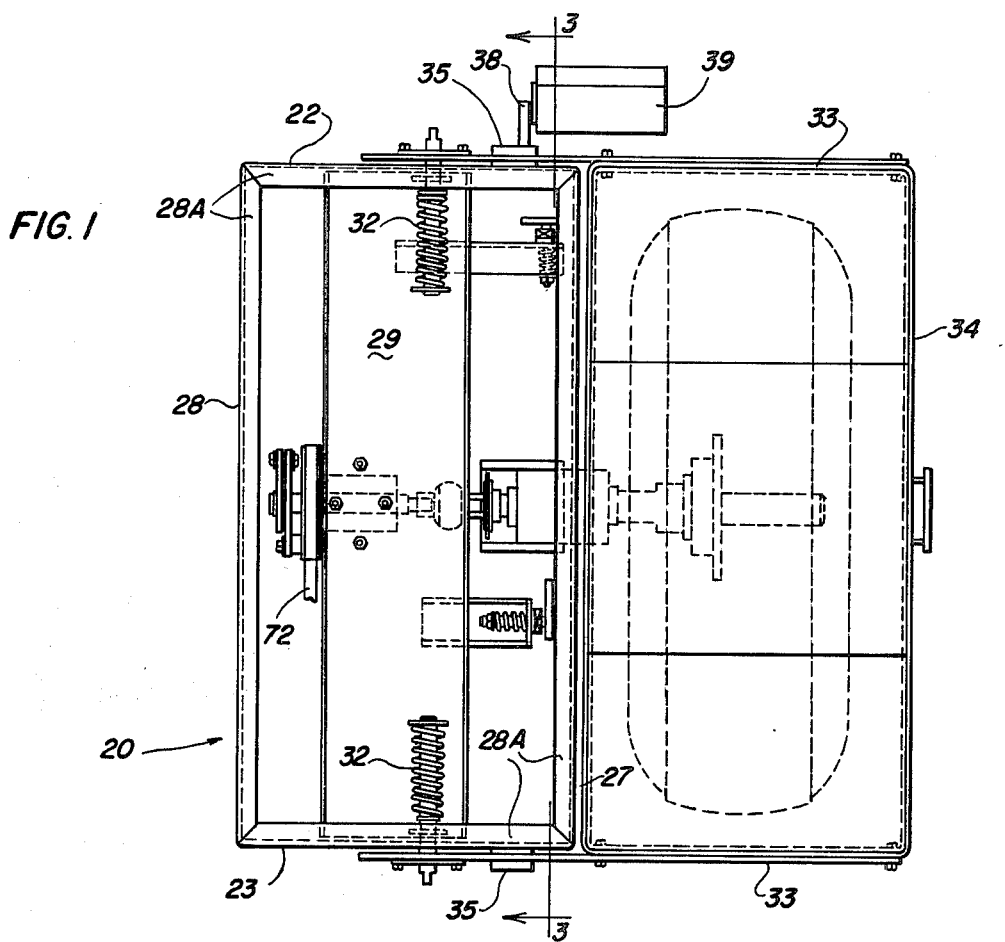
FIG. 1 is a top plan view of the present dynamic balancing apparatus for vehicle wheel and tire assemblies.
Figure 2:
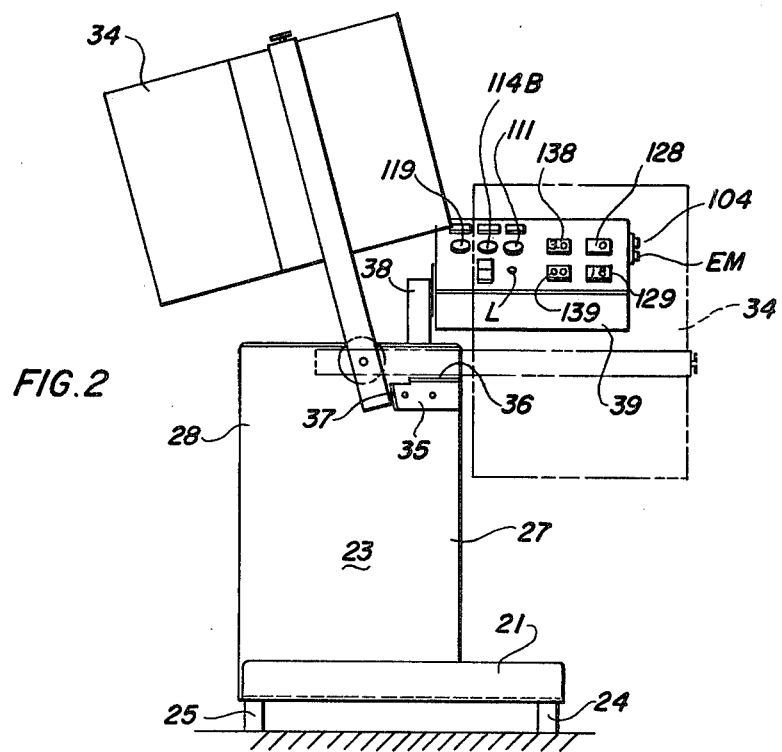
FIG. 2 is an end elevational view of the apparatus of FIG. 1 shown with the protective cover for the tire and wheel assembly in raised position.

Referring now to the drawings which set forth the structural details and operating components of the preferred embodiment of the present invention, there is seen in FIGS. 1, 2, and 3 an arrangement in which a housing 20 is supported from a shop floor on a pair of angle irons 21 which extend along the opposite ends 22 and 23 of the housing 20 such that a foot element 24 is engaged at the outer ends of the angle irons 21 in the area beneath the position where the tire and wheel assembly is to be mounted. A third foot element 25 is attached to the floor plate 26 of the housing 20 substantially centered below the mounting shaft center line for the tire and wheel assembly. The feet 24 on the angle irons 21 and the foot element 25 attached to the floor 26 form a triangular support so that the housing 20 may be placed in a stable position on the shop floor.

The housing 20 is formed with a front wall 27 and a rear wall 28 which join the respective end walls 22 and 23 to form a rigid structure which rises vertically from the floor 26 and is open at the top along inturned flanges 28A at the top of the respective front and rear walls 27 and 28 and the respective end walls 22 and 23. It can be seen in FIG. 1 that there is a longitudinal channel beam 29 which opens upwardly and extends between the end walls 22 and 23, and as seen in FIGS. 3 and 4 the beam 29 is supported on a transverse channel 30 secured to the end wall 22 and a transverse channel 31 secured to the end wall 23. The channel 29 supports pivot shafts 32 for the purpose of supporting arms 33 by which a protective cover 34 may be mounted on the housing 20 at the exterior surfaces of the end walls 22 and 23. The end wall 22 supports a bracket 35 in position to be engaged by the arm 33 when the cover 34 is in proper closed position over the tire and wheel assembly. Similarly the end wall 23 carries a bracket 35 to be engaged by the arm 33 when the cover is in closed position. Each of the brackets 35 (see FIG. 2) is formed with a suitable resilient pad 36 to be engaged by the arms 33 with the cover in closed position, and a second angularly related pad 37 is provided to be engaged by the end portions of the arms 33 when the cover is in its open or raised position. The bracket 35 attached to the end wall 22 is provided with a suitable support 38 (see FIG. 1) for receiving a box 39 in which is housed the electronic components which are placed in position to display the amount of unbalance that may be present in a tire and wheel assembly, as well as the location of the unbalance for the purpose of informing the operator where to place offsetting weight to counter balance the unbalance present in the tire and wheel assembly.

Turning now to FIGS. 3 and 4 there is shown a force responsive vibration sensitive T-beam member made up of box beam section 40 which extends parallel to the front wall 27 of the housing 20 and a box beam section 41 which extends from the beam section 40 toward the rear wall 28 and is at right angles to the beam section 40. The rearward end of the beam section 41 is provided with a plate 42 rigidly connected to the bottom surface so as to form an attachment for a vertically directed support rod 43 which is connected at its bottom end to the floor 26 of housing 20. The right hand end of beam section 40 is provided with an attachment plate 44 secured to its underside so as to provide an attachment for a second support rod 45 whose lower end is connected to the floor 26. The opposite or left end of the beam section 40 is provided with a plate 46 on its underside to provide an attachment for a third support rod 47 the bottom end of which is connected to the floor 26. Thus, it can be understood that the T-beam is supported in the fixed structure of the housing 20 on three rods 43, 45, and 47 and may be free to move substantially only in a horizontal plane relative to the fixed housing structure. The freedom of relative motion of the T-beam is restricted at the end supported by the vertical rod 45 by a horizontal directed rod 48 which has one end secured in a bracket 49 attached to the underside of the transverse channel 30, and its opposite end is attached to a bracket 50 rigidly connected to a plate 51 which is vertically directed above its attachment point to the end of the beam section 40.

Turning now to FIGS. 1, 4, and 7 it can be appreciated that the channel beam 29 is utilized to carry a shaft bearing 55 on its underside and in a position to have its axis directed perpendicularly to the front wall 27 and the rear wall 28 of the housing 20. The bearing 55 is adjustably supported by means of a saddle strap 56 which extends under the bearing 55 and has its opposite ends engaged in retainer bolts 57 attached to the beam 29. At each side of the bearing 55 and extending from fixed positions below the channel 29 there is a first pair of brackets 58 at one side of the bearing and a second pair of brackets 59 at the opposite side of the bearing. Each of the brackets 58 and 59 carries an adjusting threaded element 60 for the purpose of turning the bearing 55 in a horizontal plane on the saddle strap 56. Adjustment of the bearing in a vertical plane is obtained by a pair of adjusting elements 61 which threadedly project downwardly through the beam 29 and engage the top of the bearing 55 on opposite sides of the saddle strap 56 and along the bearing axis. The adjusting element 61 are provided for the purpose of being able to tilt the axis of the bearing 55 in a vertical plane.

A drive shaft 62 is operably carried in the bearing 55 and has its outer end 63 as shown in FIGS. 5 and 6 formed with a square head that fits with the usual clearance in a mating aperture 64 in a three-armed spider 65. The outer ends of the spider arms are bolted or otherwise secured by means 66 to a flexible annular member 67. The annular member 67, in turn, is suitably secured by means 68 at three positions to the body 69 of a pulley 70. As seen in FIG. 5 the attachment points of the spider 65 to the flexible member 67 are spaced circumferentially 120° apart and the attachment of the flexible member 67 to the body of the pulley 69 is made at points spaced apart 120°, but the arrangement is such that the resulting attachment means 66 and 68 are spaced substantially 60° apart. The belt engaging face 71 of the pulley 70 may be grooved as seen in FIG. 6 to furnish a desirable friction grip for a belt 72 having its working face similarly grooved.

A drive motor M seen in FIGS. 3 and 4 is suitably attached to a mounting plate 73, and the plate is securely attached to a transverse angle iron 74 which is pivotly supported on the front wall 27 on a pivot 75 and on the rear wall 28 on a pivot 76. It can be seen in FIG. 3 that the center of mass of the drive motor M is to the left of the axis joining the pivots 75 and 76 so that the mounting plate 73 with the motor in place tends to pivot in a counterclockwise direction. Thus, the weight of the motor M is utilized to place tension on the drive belt 72. If the weight of the motor M does not impose the desired belt tension, adjusting element 77 threadedly mounted in a bracket 78 attached to the rear wall 28 is provided to engage a bracket 79 on the angle iron 74 so that additional tension can be provided.

Still referring to FIG. 4, it can be seen that beam section 40 of the T-beam carries a shaft bearing 80 in a position to project through an enlarged aperture 81 in the front wall 27 in the housing 20. The bearing 80 is suitably secured between side plates 82 attached to the top surface of the beam section 40, and a saddle plate 83 is welded or otherwise secured to a side of the beam section 40 and to the underside of the bearing 80. A mounting shaft 84 is operably mounted in the bearing 80 and extends outwardly from the front wall 27 where it will support an attachment device 85 to receive the center opening of the wheel which is to be balanced. The inner end of the shaft 84 passes between the side plates 82 and supports a suitable encoder disc 86 which rotates with the shaft 84. Inwardly beyond the encoder disc 86 is a suitable universal joint (not shown) protected by a flexible cover 87 whereby the shaft 84 is operably connected to the adjacent end 62A of the drive shaft 62. It can now be appreciated that since the bearing 80 is rigidly connected to the beam section 40 of the T-beam there can be no positional adjustment. Thus, alignment adjustment must be provided for the bearing 55 which is fixed to and supported under the beam 29 carried by the housing 20. Alignment of the shafts 84 and 62 must be obtained with a minimum of misalignment so as to avoid introducing unnecessary problems in transferring the drive from the motor M to the wheel and tire assembly, and there must be substantially ability of the T-beam to respond freely to the unbalance forces that may be present in the tire and wheel assembly.

Turning now to FIG. 8 there is shown at the end of the beam section 40 adjacent the restricting rod 48 a supporting channel member 90 which is secured to the under side of beam 29 and in position to extend over the beam section 40 and spaced from the bracket plate 51 rigidly secured to the adjacent end of the beam section 40. The channel member 90 and the bracket plate 51 have a sensor element 91 positioned between them. Element 91 can be a piezoelectric crystal which is the sensor element that will be subjected to the load transmitted between the bracket plate 51 and the channel member 90. It is desirable to maintain a preload on the crystal sensor 91 at all times by means of a rod 92 secured to the bracket plate 51 and extending loosely through an aperture in the channel member 90 to receive a preload spring 93 whose force may be varied by adjusting the position of a nut 94. The preload will maintain the crystal under compression load.

FIGS. 9 and 10 illustrate the mounted provision for a second sensor which is a piezoelectric crystal 95 mounted between the bracket plate 96 secured to the side of the beam section 40 and the end wall 97 on a support member 98 rigidly attached to the underside of the beam 29. The crystal sensor 95 is desirably under a compressive preload at all times by means of the adjustable tension spring 99 and the adjusting nut 100 working on rod 101 attached to the bracket 96 and extending loosely through an aperture in the end 97 of the support 98.

It is evident from FIGS. 1 and 4 that the unbalance forces in the wheel and tire assembly W can be counterbalanced if suitable weights are attached to the usual flanges at the opposite sides of the wheel on which the tire is mounted. Thus, for purposes of balancing the assembly W it is assumed that the unbalancing forces are in the opposite wheel rim planes. With this in mind, it is clear that the assembly W is permitted to move substantially only in one plane by reason of the effect of the supporting rods 43, 45, and 47 attached to the T-beam box sections 40 and 41. Furthermore, the motion in that permitted plane is restricted by rod 48 which prevents motion of the T-beam end at support rod 45 in a direction parallel to the shaft 84. The result of mounting the T-beam in this manner is to cause the unbalance forces to develop load reactions in both of the crystal sensors 91 and 95 at the same time.

FIG. 11 presents the geometric analysis by which the forces registered at the respective sensors 91 and 95 may be interpreted in terms of the forces $F_1$ and $F_2$ in the opposite planes of the tire and wheel assembly W mounted to rotate about the axis of the shaft mounted in bearing 80. Certain physical assumptions determine that the thickness between the opposite rims where weights can be attached to the wheel and tire is $d_2 - d_1$, and that the moment arm D is the effective dimension measured in the plane extending from the center of the sensor 91 to the center of the sensor 95. The dimensions $d_1$ and $d_2$ are measured from the plane joining the central area of the sensors 91 and 95. The unbalance in the outer plane of the assembly W is represented by $F_1$ and the unbalance in the inner plane is represented by $F_2$. The presence of horizontal rod 48 adjacent the location of the sensor 91 will force the T-beam and support rods 43, 45, and 47 to respond to unbalance substantially in one plane with the effective center of such motion adjacent the sensor 91. It follows from this that the moments summed about crystal sensor 91 is expressed in the equation $$Df_1 = d_1F_2 + d_2F_1 \qquad (1)$$
$$f_1 = \frac{d_1F_2 + d_2F_1}{D}$$

Furthermore, the sum of the forces in the permitted plane of response to unbalance forces is expressed in the equation $$f_2 = F_1 + F_2 \qquad (2)$$
$$F_2 = f_2 - F_1$$

Solving for $F_1$ it follows that $$Df_1 = d_1(f_2 - F_1) + d_2F_1 \qquad (3)$$
$$Df_1 = d_1f_2 + F_1(d_2 - d_1)$$
$$F_1(d_2 - d_1) = Df_1 - d_1f_2$$
$$F_1 = \frac{Df_1 - d_1f_2}{d_2 - d_1}$$

Thus, equations (2) and (3) are the plane separation equations needed to distinguish the amount of unbalance that may exist in the wheel and tire assembly when confined to the planes of the rim on opposite sides.

In equation (3) the term $d_2-d_1$ is the known effective wheel rim width, and the term D is the known dimension of the moment arm for the force applied at sensor 91. Thus, the terms $f_1$ and $f_2$ in that equation (3) are proportional to the forces exerted on the respective sensors 95 and 91. From the facts given above equation (2) can be solved for $F_2$ by substituting for $F_1$ as follows from equation (3)

$$F_2 = f_1 - \frac{Df_1 - d_1f_2}{d_2 - d_1} \qquad (4)$$

Figure 12:
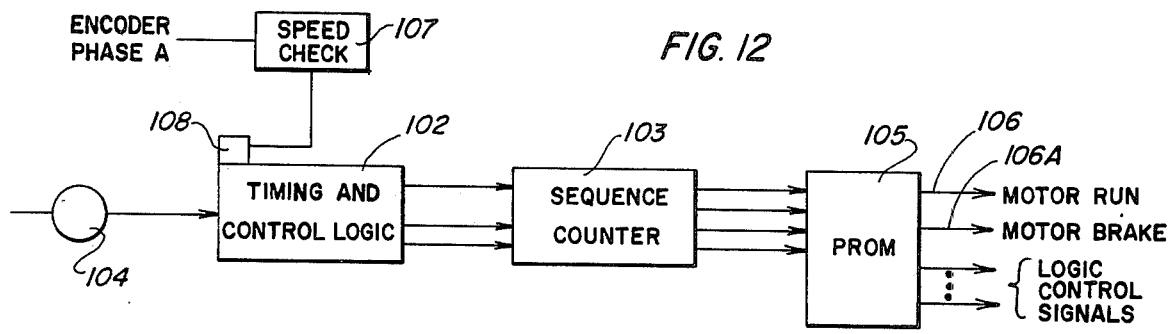
FIG. 12 is a block diagram of the principal circuit arrangement for the balancer assembly seen in FIGS. 1 and 2.

FIGS. 12 and 13 depict block diagrams of the electronic components in a circuit arrangement for developing the responses of the mechanism seen in FIGS. 4 and 11. The circuit arrangement is intended to solve the problem of the force of an unbalancing mass in two planes of a rotating wheel and tire assembly which is expressed by the equation $$F = mr\omega^2 \qquad (5)$$

where the terms
  m = mass of counterbalance weight to be added
  r = radius of the wheel
  $\omega^2$ = square of the angular velocity Most vehicle tires and wheel rims have significant width so that the unbalancing forces within that assembly may be divided between the front and rear planes of the wheel rim. Thus, to perform dynamic balancing, or to test for the presence of unbalance in the tire and wheel assembly it is necessary to measure and locate the unbalancing forces in each of the planes at the wheel rim. The diagrams seen in FIGS. 12 and 13 perform the necessary functions and display the results in terms of the weight needed to counterbalance any unbalancing force, as well as the position where the weight needs to be located around the circumference of the front and rear rims of the wheel. The electronic timing and control logic 102 controls a sequence unit 103 which is basically a counter that steps through the sequence of operations. The start of the system is initiated by switch 104, and the counter 103 addresses a PROM or programmable read only memory unit 105 which contains the "program" for each step of the sequence. The PROM unit 105 includes circuits 106 and 106A to motor M to start, run and brake the same in sequencing it up to a speed in the range of from 450 to 550 RPM where readings are taken of the unbalance force in the two planes of the wheel rim as well as the angular location for a counterbalancing weight to off-set the unbalance force. The PROM unit 105 also controls the rest of the electronics.

The steps of the sequence cannot advance until certain conditions are satisfied; for example, the motor M must continue running until measurements are completed. Different size and weight wheels will take varying amounts of time to come up to speed. Since speed (angular velocity) is squared in the unbalance equation (5), noted above, the measurements must always be taken at the same speed or RPM. The speed check unit 107 counts an internal 40KHz clock 108 in the logic 102. The number of clock counts between slots in the encoder disc 86 (FIG. 17) indicates relative speed, and this count is averaged over four slots to minimize mechanical variations of the slot spacing or slot edges, as well as to reduce the effect of plus or minus one count uncertainty.

Figure 14:
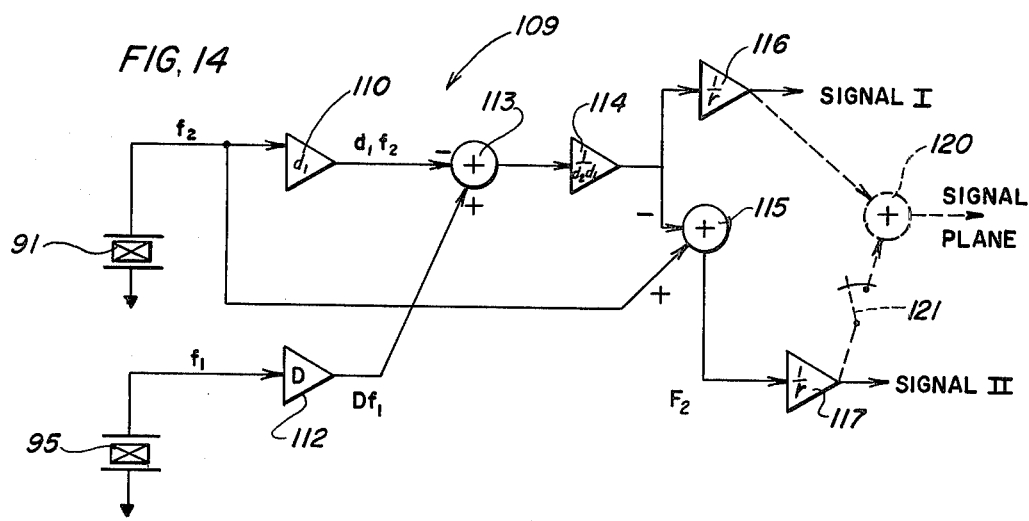
FIG. 14 is a schematic circuit arrangement in the plane separation means of the diagram of FIG. 13.

The forces detected by the piezoelectric crystal transducers 91 and 95 are not simply the wheel plane unbalancing forces, but as seen in equations (2), (3), and (4) they must be resolved into the wheel plane components. The plane separation circuit 109 of FIG. 13 is shown in greater detail in FIG. 14. In the latter view the equations (3) and (4) previously identified are implemented. The gain of each amplifier is illustrated in FIG. 14. The signal from transducer 91 proportional to the force $f_2$ is multiplied by amplifier 110 by the distance $d_1$ measured out to the plane of the wheel rim at the inside where a balancing weight is to be located. The measurement $d_1$ is entered into the amplifier 110 by the setting of the distance potentiometer 111A obtained at selector knob 111 on the panel of box 39. The signal $f_1$ from transducer 95 is multiplied by the dimensional constant D (FIG. 11) at amplifier 112, and these terms are subtracted at a summing junction 113. This is the numerator of $F_1$ $(Df_1-d_1f_2)$ in equation (3). When this numerator is multiplied in amplifier 114 by $1/(d_2-d_1)$ (which is the wheel rim width as entered by the rim potentiometer 114A controlled by knob 114B on the panel of box 39) the value is $F_1$ which is the force of unbalance in the wheel plane at distance $d_2$. By using equation (2) it follows that $F_2$ equals $f_2-F_1$ as done in summing junction 115 which is the force of unbalance at the wheel plane at distance $d_1$. Resolved forces are then adjusted in amplifier 116 and 117 for wheel radius, as in equation (5), by wheel diameter potentiometer selector 118 controlled by knob 119 on the panel of box 39.

In some wheel designs it is not practical to attach a balance weight on the inside rim, such as is the case with Mag. wheels. Hence, balancing is limited to a single plane, and for that situation the plane separation circuit of FIG. 14 is provided with an alternate circuit in which the signals from amplifiers 116 and 117 are combined in a summing junction 120 upon shifting the selector switch 121 from its normally open "2-PLANE" setting to the "1-PLANE" setting. However, with switch 121 in its normal "2-PLANE" setting, the outputs (FIG. 13) 122 and 123 from the plane separation circuit 109 become then signal I and signal II for the respective planes. These signals are fed respectively to band pass filters 124 and 125, and are centered at rotational frequency to remove noise from the desired force signals. The rotational frequency is in the range of 450 to 550 RPM which is about 7.5 to 9Hz.

Figure 15:
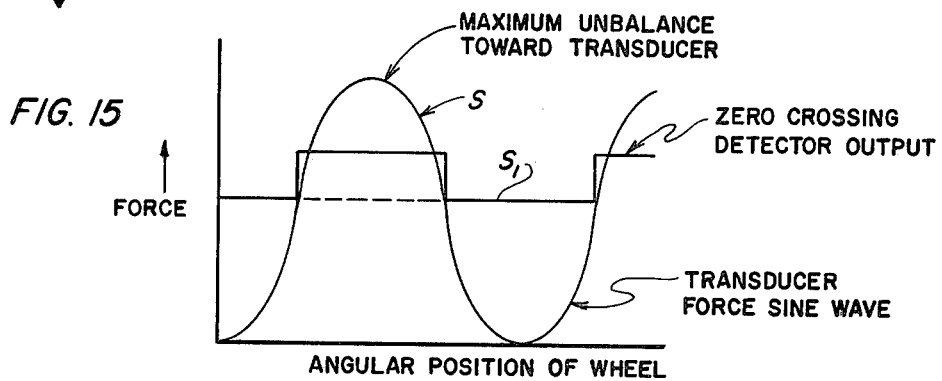
FIG. 15 is a graph of the sinusoidal waveform relating the unbalance force with angular position of the wheel and tire.

The position of each weight to compensate for each unbalance force is determined by the zero crossing of the sinusoidal force waveform S as shown in FIG. 15. The zero crossing is detected by the detectors 126 and 127 which are electronic circuits operative to convert the sine wave force signals from the respective filters 124 and 125 into square waves $S_1$. The transition points for the square wave $S_1$ coincide with the zero force points of the sine wave S. By detecting this event and then keeping track of position through the slots in the encoder wheel 86, it is possible to display information to the operator for placement of the counter balancing weight. In order to overcome the possibility of error due to electrical noise and zero crossing shift, a unique circuit arrangement is incorporated. The circuit includes two digit displays 128 and 129, one for each plane to show position differences, if any. That is, these displays 128 and 129 show the distance from where the wheel is to where the weight needs to be positioned. In other words, the operator turns the wheel until the display shows zero, then the weight is attached in line with an index mark (not shown) on the housing or the weight is attached at a point at the top of the vertical diameter. This operation applies to each plane, as is shown on the panel for box 39 where the POSITION-PLANE I display 128 and POSITION-PLANE II display 129 are shown. To generate this display each plane has an up/down position counter 128A and 129A (modulo 72 for the 72 slotted encoder wheel 86).

Figure 17:
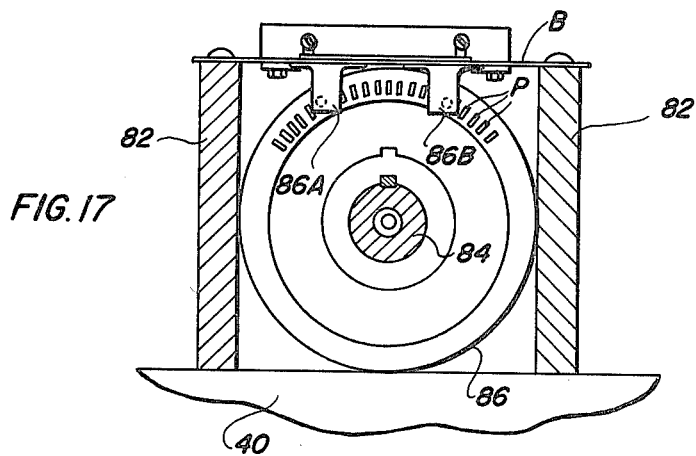
FIG. 17 is a fragmentary view of the encoder disc as seen along line 17—17 in FIG. 4.

FIG. 17 shows the encoder disc 86 mounted on shaft 84 so as to rotate with the wheel and tire assembly W. A mounting board B may be supported by the side plates 82 for the purpose of locating light emitting diode and phototransistor units 86A and 86B straddling the disc 86 so the light will be chopped by the disc slots P to generate square waves of voltage corresponding to the slots blocking and unblocking the light beams as the disc 86 rotates. The placement of the units 86A and 86B is important as they provide overlapping square waves in quadrature. On disc 86 with 72 slots P, the slots are spaced apart by 5° of arc, and quadrature means $1\frac{1}{4}$° of arc or $\frac{1}{4}$ of a slot of overlap. These two electro-optical units generate signals which can be referred to as Encoder Phase A from phototransistor unit 86A and Encoder Phase B from phototransistor unit 86B. Thus, the signals Phase A and Phase B are fed into a direction of rotation sensing circuit 88 (FIG. 13). From that circuit signals are transmitted to position control means 89 where appropriate signals are sent to the respective position counters 128A and 129A. The units 86A and 86B thus determine both direction of wheel and tire rotation and position tracking.

At measurement time sensed from PROM 105 these position counters 128A and 129A are cleared upon the first downward zero crossing for the respective plane of the associated transducer 91 and 95. Thereafter the counter runs continuously to keep track of the encoder signals. Upon each upward zero crossing the counters are sampled and the contents added to the previous subtotals collected in position average and hold circuits 130 and 131 respectively. Ten samples are taken, and the resultant sums are divided by ten. The position averages are stored and continuously subtracted in position subtractor units 132 and 133 from the respective absolute present position detected by the position counters 130 and 131. The difference number arrived at in this manner is displayed to the operator in the displays 128 and 129.

Figure 16:
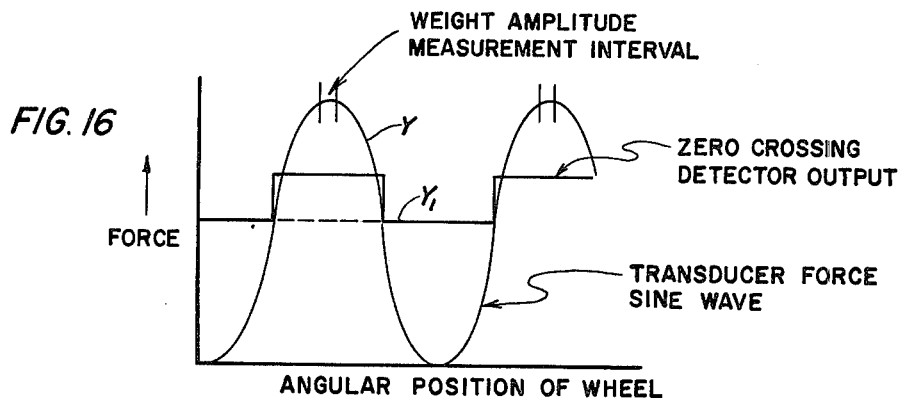
FIG. 16 is a graph similar to that of FIG. 15, but indicating the measurement of the unbalance weight amplitude.

Unbalance weight amount is determined by measuring the amplitude of the force signal sinewave Y. The following unique circuit is employed to convert the sinusoidal signals to digital values without having to sample and hold, and then digitally average the digital value over ten cycles of the signal. The present procedure is simplified by using a voltage to frequency (V/F) converter instead of the conventional analog to digital (A/D) converter. The output from each of the converters 134 and 135 is a digital pulse train whose frequency is proportional to the input force signal voltage. The output must be counted over a timebase (one second in typical applications) to finalize the conversion. The voltage to frequency (V/F) converter will track the 7.5 to 9Hz unbalance sinewave Y of FIG. 16. At the wave peak it will count the frequency for about two milliseconds. In a 72 slot encoder it happens that the peak position is one fourth revolution or 18 encoder slots from the zero crossing. Sinewave changes are gentle near the peaks and measurements can be taken over 20° centered at the peak ($\pm 10°$) with less than a 1.5% error. Since there is a 5° position uncertainty caused by the limitations of 72 encoder slots, it is expedient to limit the measurement range to 5.4°, about 2 milliseconds in time. By repeating the process ten times an average by cumulative counting is obtained in counters 136 and 137. The contents of these counters is displayed at digital units 138 and 139 respectively. The process is controlled by the measure control circuit 137A to regulate the 2 milliseconds time interval and ten times average.

The uniqueness of the foregoing system resides in the continuous display that can be presented on the panel of box 39 (FIG. 2) with respect to the position of unbalance in two planes of the wheel and tire assembly W, and the amount of weight to counterbalance the unbalance. The circuit of FIG. 13 presents the source of the digital displays 128 and 129 for the respective planes in which the display counts from zero to thirty six and back to zero so that when zero shows in the position displays the position of the wheel and tire W is established for placement of a counter balancing weight at the top of the vertical diameter. While the displays 138 and 139 are synchronized with displays 128 and 129, the amount of weight needed to counterbalance is always displayed at either display 138 or 139 whether the wheel and tire is spinning or not. In the example shown in FIG. 2 the amount of unbalance force in the outside plane is three ounces and the tire has been rotated to bring zero into display 128. Should the weight needed to overcome the unbalance for either plane I or plane II be greater than 10, an overflow signal light $L_1$ or $L_2$ will come on to indicate that a ten ounce weight should be affixed and the wheel and tire spun again.

Figure 18:
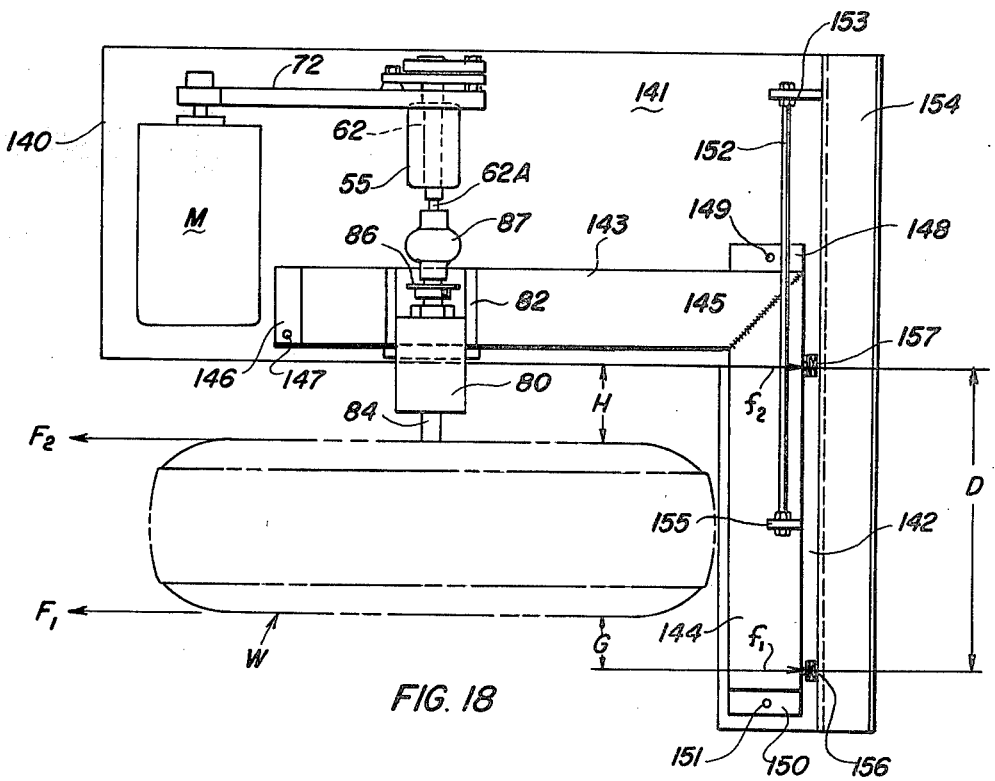
FIG. 18 is a schematic plan view of a modified dynamic balancing apparatus for rotating wheel and tire assembly.

Referring now to FIG. 18 there is shown a wheel and tire balancing apparatus of a modified configuration from that shown and described above. The apparatus is shown only in a schematic form where the operating components are disposed in a body frame 140 which has an L-shaped floor with a main portion 141 connected to a lateral floor portion 142. The arrangement of the floor in an L-shape in the frame 140 is necessary in order to accommodate an unbalance force sensitive member which is L-shaped, with a longitudinal box beam section 143 and a right angularly directed box beam section 144 secured to the beam section 143 along a weldment 145. One extremity of the beam section 143 is provided with a mounting tab 146 which is supported on the upper end of a rod 147, the lower end being secured in the floor 141. The elbow junction 145 between the beam section 143 and the section 144 is provided with a tab 148 which is connected to the upper end of a supporting rod 149, the lower end of rod being secured in the floor 141. The outer end of beam section 144 is provided with a tab 150 connected to the upper end of a rod 151 which supports the same with its lower end mounted in the floor 142. The respective supporting rods 147, 149 and 151 are substantially the same length so that the beam member will move in substantially only one plane. Control over the motion of the beam member is obtained by the provision of a motion limiting rod 152 having one end fixed in a bracket 153 connected to a beam member 154 fixed in the frame 141 at substantially the elevation of the beam section 144 and extending substantially parallel thereto. The opposite end of the rod 152 is attached to a bracket 155 secured to the beam section 144. The function of the motion control rod 152 is to check motion of the beam section 144 parallel to the frame beam member 154.

It should be understood that wheel and tire assembly W is supported on a shaft 84 as previously described in connection with FIG. 4. Similarly, the shaft 84 is carried in a bearing housing 80 supported between side members 82 which forms a protective space for the encoder disc 86. The shaft 84 is connected by a universal joint (not shown) enclosed in a protective cover 87. The drive shaft 62 has its end 62A engaged in the universal joint, and the shaft 64 is operatively carried in a bearing housing 55 which is accurately aligned with the bearing housing 80 so as to avoid misalignment of the shafts 62 and 84. The motor drive for shaft 62 is substantially the same as previously described in connection with FIGS. 4, 5, and 6. Accordingly, the same reference numerals will be used to designate similar parts so as to avoid unnecessary description.

Figure 19:
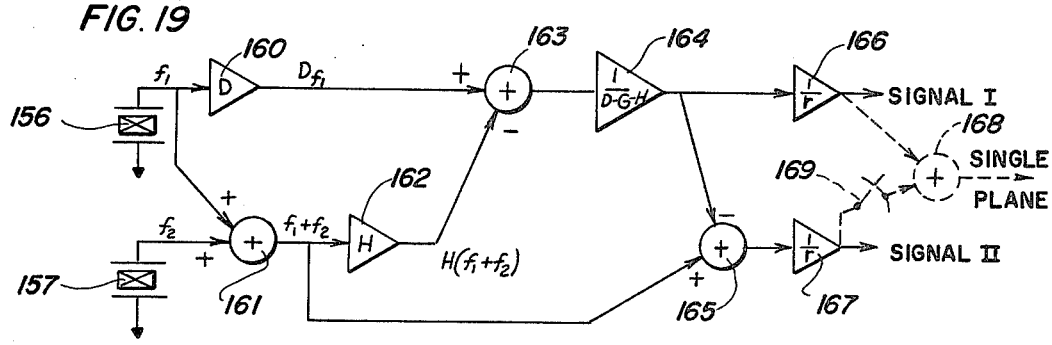
FIG. 19 is a modified circuit arrangement suitable for the arrangement of components shown in the modified apparatus of FIG. 18.

In the assembly shown in FIG. 18, there are a pair of piezoelectric crystal transducers 156 and 157 operatively supported between the fixed beam member 154 in the frame 140 and the adjacent surface of the beam section 144. Although not shown, it is understood that each of the crystal transducers will be provided with means, such as those seen at FIGS. 8 and 9 for the transducers 91 and 95, to preload the crystals so that there is essentially compression at all times. In this manner the force $f_1$ exceeding the amount of preload is caused by the presence of unbalance and is picked up by the transducer crystals 156 displaced outwardly a distance G from the adjacent plane of the wheel and tire assembly W. The force $f_2$ in the same manner is picked up by the transducer 157 displaced inwardly a distance H spaced from the opposite plane of the wheel and tire assembly W. The unbalance in the wheel and tire assembly W is represented by the forces $F_1$ and $F_2$ in the outer and inner planes respectively which are the planes of the wheel rim where the counterbalancing weight is normally mounted. The signals produced at the respective transducers 156 and 157 are processed in the manner above described in connection with the circuits of FIGS. 12 and 13, with the exception that the plane separation circuit is modified according to the circuit diagram of FIG. 19. The plane separation equations pertaining to the modification in FIG. 18 are as follows in which the sum of the moments about the transducer crystal 157 is $$Df_1 = HF_2 + (D-G)F_1 \tag{6}$$

The sum of the forces in the permitted plane of response to unbalance forces is expressed in the equation $$F_1 + F_2 = f_1 + f_2 \tag{7}$$

Solving for $F_1$ it follows that $$F_1 = [Df_1 - H(f_1 + f_2)]/(D-G-H) \tag{8}$$

where $D-G-H$ is the wheel width.
Solving for $F_2$ it follows that $$F_2 = f_1 + f_2 - \left[ \frac{Df_1 - H(f_1 + f_2)}{(D-G-H)} \right] \tag{9}$$

The only difference in the signal processing electronics for the alternate mechanical configuration of FIG. 18 over the configuration in FIG. 11 is the contents of the plane separation block 109. The alternate plane separation circuitry is expanded in FIG. 19. It implements the plane separation equations (8) and (9) previously identified. The signal proportional to force $f_1$ is multiplied in amplifier 160 by D which is the distance between the piezoelectric transducers 156 and 157. In parallel the signal proportional to $f_1$ is added to the signal proportional to $f_2$ at summing junction 161. This sum is multiplied in amplifier 162 by H, the distance from the inner wheel rim to transducer 157 sensing $f_2$. Summing junction 163 then subtracts the two terms completing the calculation of the numerator of $F_1$ in equation (8). The amplifier 164 divides this numerator by $D-H-G$, where G is the distance from the outer wheel rim to the location of the transducer 156 sensing $f_1$. $F_2$ is simply calculated by summing junction 165, which is the difference between the sum of $F_1 + f_2$ and $F_1$. The two resolved forces are then adjusted for wheel radius, as in previously explained equation (4), by amplifier 166 and 167. When it is not practical to apply balancing weights in two planes, as noted for the circuit modification in FIG. 14, an alternate circuit is provided for a single plane situation. Selector switch 169 is actuated to bring into operation a summing junction 168 which adds the signals from the amplifiers 166 and 167 and produces a signal equivalent to the value of a single balancing weight.

SUMMARY OF THE INVENTION

The present invention is capable of being put into practice in either structural form seen in FIG. 11 or in FIG. 18. These forms have the common features that the force transducers do not have to be moved to come into alignment with the planes of unbalance where counterbalancing weights may be secured. In the arrangement seen in FIG. 11 the transducers are fixed at the same side of the wheel and tire on an alignment substantially parallel with the plane of rotation but off set and on opposite sides of the axis of rotation. The transducers 91 and 95 have the force sensitive axes arranged at 90° to each other which yields a desired sensitivity to the separation of the unbalance forces in the inner and outer planes of counterbalance weight location. The responsive signals generated by the transducer crystals 91 and 95, or by the transducer crystals 156 and 157 are greatly enhanced by the use of relatively stiff preload springs 93 and 99 so as not to develop sympathetic vibration during wheel and tire rotation.

The modification seen in FIG. 18 has the transducer crystals disposed at the same side of the axis of rotation and outside the planes of unbalance. The sensitivity of the transducers 156 and 157 is improved by the off-set arrangement thereof, thus making the width of the wheel and tire the variable, rather than the position of the transducers which are in fixed positions. It is not practical to shift the transducers 156 and 157 and place them in alignment with the outer and inner planes of the wheel and tire where counterbalancing weights are normally located. It is preferred to account for wheel and tire diameter (size) and thickness (rim width) and distance away from a reference plane by incorporating adjustable potentiometer means, shown at 110, 114A, and 118, under the control of knobs 111, 114B and 119 respectively.

There has also been set forth above means for selecting operation of the machine for testing the balance of a wheel and tire in only one plane. This is done by collecting the responses from the pair of transducers and summing them to produce a single display of weight that will counterbalance the unbalance present, if any.

What is claimed is:

1. In a balance testing machine for vehicle wheel and tire assemblies having inside and outside reference planes representing the thickness of the assembly as measured along the axis of rotation, the combination comprising: a frame; a drive shaft in said frame; an unbalance force sensitive member in said frame; a drive motor connected to said drive shaft; a driven shaft carried by said force sensitive member and flexibly connected to said drive shaft; a plurality of flexible means supporting said force sensitive member in operative position in said frame to permit said force sensitive member to react in response to unbalance forces substantially only on one plane, said flexible means being directed at substantially right angles to said force sensitive member; a wheel and tire assembly rotatively carried by said driven shaft in position to have its inside reference plane spaced from and substantially parallel with a portion of said force sensitive member a distance less than its outside reference plane; force transducer means operatively disposed under preload between said frame and a portion of said force sensitive member for substantially rigidly engaging the same and being positioned outside of alignment with and spaced from the inside and outside reference planes a fixed distance; means connected to said force transducer means for converting the unbalance force sensed thereby into terms of counter balancing weight; and monitoring means responsive to rotation of said wheel and tire and adapted to locate the angular position of unbalance about the circumference of the wheel and tire.

2. The balance testing machine set forth in claim 1, wherein said force transducer means comprise a pair thereof spaced apart and on opposite sides of the axis of rotation of said wheel and tire and having axes of reaction to unbalance forces oriented at substantially 90° to each other.

3. The balance testing machine set forth in claim 1, wherein said force transducer means comprise a pair thereof spaced apart in a direction substantially parallel to said driven shaft and at a spacing distance greater than the distance between said inside and outside reference planes.

4. A vehicle wheel and tire balance testing machine comprising: an unbalance force sensitive member in the form of a T-beam having three extremities; a rotary shaft carried by said force sensitive member for supporting the wheel and tire in position to be tested for balance; flexible support means connected to said force sensitive member adjacent said extremities of said T-beam; a fixed frame structure supporting said flexible support means for permitting said force sensitive member to respond to unbalance forces in substantially one plane; force sensitive transducer means disposed between said fixed structure and said force sensitive member in fixed position outside of said reference planes, said transducer means generating electrical signals proportional to the unbalance force in the reference planes of the wheel and tire to be tested; and monitoring means on said rotary shaft in position for monitoring the angular positions of unbalance in the wheel and tire.

5. The wheel and tire balance testing machine set forth in claim 4, wherein said transducer means are spaced apart in a direction substantially parallel to the diameter dimension of the wheel and tire so as to be adjacent at least two of said three extremities and on opposite sides of the axis of shaft rotation.

6. A vehicle wheel and tire balance testing machine comprising: an unbalance force sensitive member in the form of an L-shaped beam having end extremities and an elbow; a rotary shaft carried by said force sensitive member for supporting the wheel and tire in position to be tested for balance; flexible support means connect adjacent said end extremities and said elbow; a fixed frame structure supporting said flexible support means for permitting said force sensitive member to respond to unbalance forces in substantially one plane; force sensitive transducer means disposed between said fixed structure and said force sensitive member in fixed position outside of said reference planes, said transducer means generating electrical signals proportional to the unbalance force in the reference planes of the wheel and tire to be tested; and monitoring means on said rotary shaft in position for monitoring the angular positions of unbalance in the wheel and tire.

7. A vehicle wheel and tire balance testing machine for a wheel and tire assembly having predetermined reference planes at opposite sides of said assembly for receiving counterbalancing weights and comprising: a frame; an unbalance force sensitive member, said sensitive member having portions directed at substantially right angles to each other; spaced apart flexible supports extending from said sensitive member for connection with and to be carried by said frame; shaft means on said force sensitive member in position for rotatively mounting a wheel and tire assembly from one of said portions in position to determine the presence of unbalancing forces during rotation; a pair of force transducer means fixed in spaced apart relation and operatively mounted under preload so as to be substantially rigidly engaged between said frame and said force sensitive member in positions outside the predetermined reference planes of the wheel and tire assembly, each of said force transducer means being sensitive to and related to a different reference plane of the wheel and tire assembly; drive means operatively mounted in said frame and connected to said shaft means for rotating the wheel and tire assembly; electronic plane separation circuit means connected to said transducer means; other circuits connected to said plane separation circuit means for displaying the amount of unbalance in each plane of the rotated wheel and tire assembly; and locating means operatively responsive to rotation of said shaft means for coordinating the position of the unbalance around the circumference of the wheel and tire assembly with the display of the amount of unbalance.

8. The wheel and tire balance testing machine set forth in claim 7, wherein said substantially right angular portions of said force sensitive member are of unequal length, and said shaft means is on the longer portion, and said pair of transducer means are spaced along the length of one of said unequal length portions.

9. The wheel and tire balance testing machine set forth in claim 8, wherein said pair of transducer means are spaced apart along the length of the longer portion so as to be substantially parallel to the diameter dimension of the wheel and tire assembly and on opposite sides of said wheel and tire assembly mounting shaft means.

10. The wheel and tire balance testing machine set forth in claim 8, wherein said pair of transducers are spaced apart along the length of the shorter portion of said force sensitive member so as to be substantially parallel to said wheel and tire assembly mounting shaft means and on the same side thereof.

11. A vehicle wheel and tire balance testing machine comprising: a stationary frame; an unbalance force sensitive member having angularly related portions ending at spaced extremities; a flexible support connected adjacent each extremity and extending into connection with said frame for operably mounting said member in said frame for movement in substantially only one plane; rotary shaft means carried by said force sensitive member for mounting the wheel and tire thereon; first transducer means disposed in a predetermined fixed and preloaded position between said frame and said force sensitive member to generate signals proportional to the unbalance at a location where the presence of unbalance in a first plane of the wheel and tire predominates; second transducer means spaced from said first transducer means and disposed in a predetermined fixed and preloaded position between said frame and said force sensitive member to generate signals proportional to the unbalance at a location where the presence of unbalance in a second plane of the wheel and tire predominates; means interconnecting said force sensitive member and said frame for restricting the freedom of motion of said force sensitive member within said one plane; separate display means for showing the amount of unbalance in said first and second planes; and signal processing electronic circuit means operatively connected between said first and second transducer means, said signal processing electronic circuit means processing the signals generated by said transducer means and separating said signals according to the values representing the unbalance present in the respective first and second planes, and said separate display means concurrently displaying the amount of the unbalance.

* * * * *